United States Patent
Orr et al.

(10) Patent No.: US 6,590,680 B2
(45) Date of Patent: *Jul. 8, 2003

(54) HOLOGRAPHIC OPTICAL ELEMENT

(75) Inventors: Edwina Margaret Orr, London (GB); David John Trayner, London (GB)

(73) Assignee: Richmond Holographic Research & Development Limited, London (GB)

( * ) Notice: Subject to any disclaimer, the term of this patent is extended or adjusted under 35 U.S.C. 154(b) by 10 days.

This patent is subject to a terminal disclaimer.

(21) Appl. No.: 09/845,833

(22) Filed: May 1, 2001

(65) Prior Publication Data

US 2002/0126331 A1 Sep. 12, 2002

Related U.S. Application Data

(60) Continuation of application No. 09/628,224, filed on Jul. 28, 2000, now Pat. No. 6,233,071, which is a division of application No. 08/750,364, filed as application No. PCT/GB95/01322 on Jun. 17, 1995, now Pat. No. 6,157,474.

(30) Foreign Application Priority Data

Jun. 7, 1994 (GB) ............................................. 9411561

(51) Int. Cl.$^7$ ................................................. G02B 5/32
(52) U.S. Cl. ............................. 359/23; 359/24; 359/15; 359/28
(58) Field of Search ............................. 359/15, 23, 24, 359/27, 28

(56) References Cited

U.S. PATENT DOCUMENTS

| | | | |
|---|---|---|---|
| 3,802,769 A | 4/1974 | Rotz et al. |
| 4,429,946 A | 2/1984 | Haines |
| 4,455,061 A | 6/1984 | Case |
| 4,993,790 A | 2/1991 | Vick |
| 5,011,244 A | 4/1991 | Smith et al. |
| 5,289,298 A | 2/1994 | Smith |
| 5,339,305 A | 8/1994 | Curtis et al. |
| 5,416,616 A | 5/1995 | Jenkins et al. |
| 5,506,701 A | 4/1996 | Ichikawa |
| 5,774,262 A | 6/1998 | Schwerdtner et al. |
| 6,157,474 A | 12/2000 | Orr et al. |

FOREIGN PATENT DOCUMENTS

| | | |
|---|---|---|
| DE | 4 004 739 | 8/1991 |
| EP | 0 452 815 | 10/1991 |
| WO | 82 04327 | 12/1982 |
| WO | 93 02372 | 2/1993 |
| WO | 94 04956 | 3/1994 |
| WO | 94 23340 | 10/1994 |

*Primary Examiner*—Audrey Chang
*Assistant Examiner*—Fayez Assaf
(74) *Attorney, Agent, or Firm*—Blank Rome, LLP

(57) ABSTRACT

A holographic optical element comprising at least two sets of regions, the regions of each set being different from the regions of the other set(s) and being interleaved or overlapping with the regions of the other set(s) and being constructed such that light incident on each set of regions is directed to a respective one of a plurality of viewing zones.

The holographic optical element is typically incorporated in a display device such as a stereoscopic display device.

18 Claims, 9 Drawing Sheets

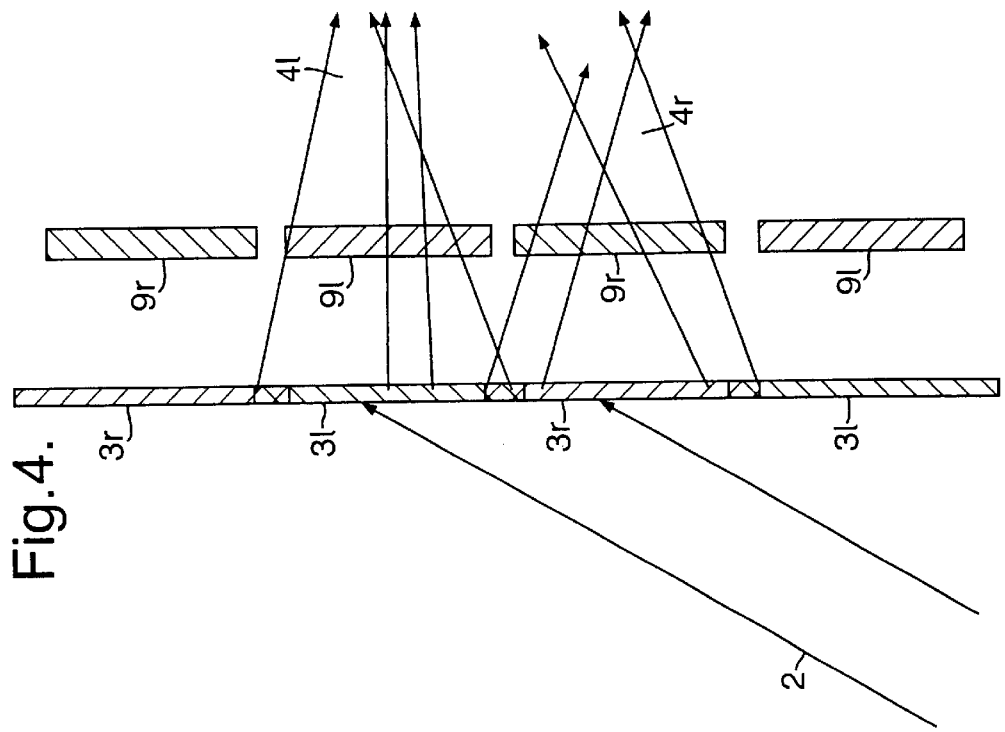
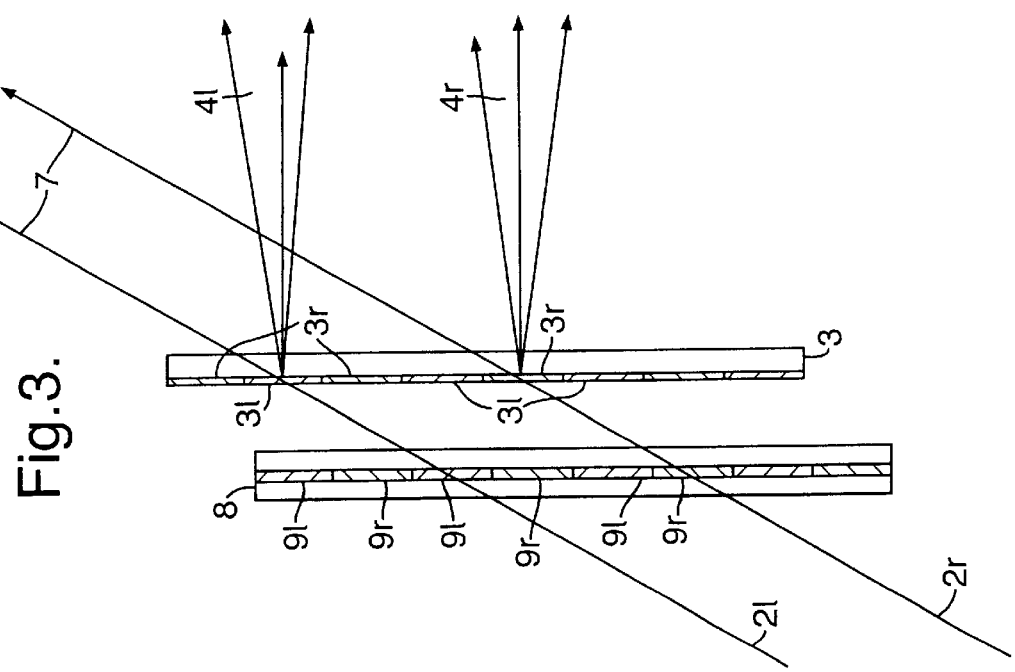

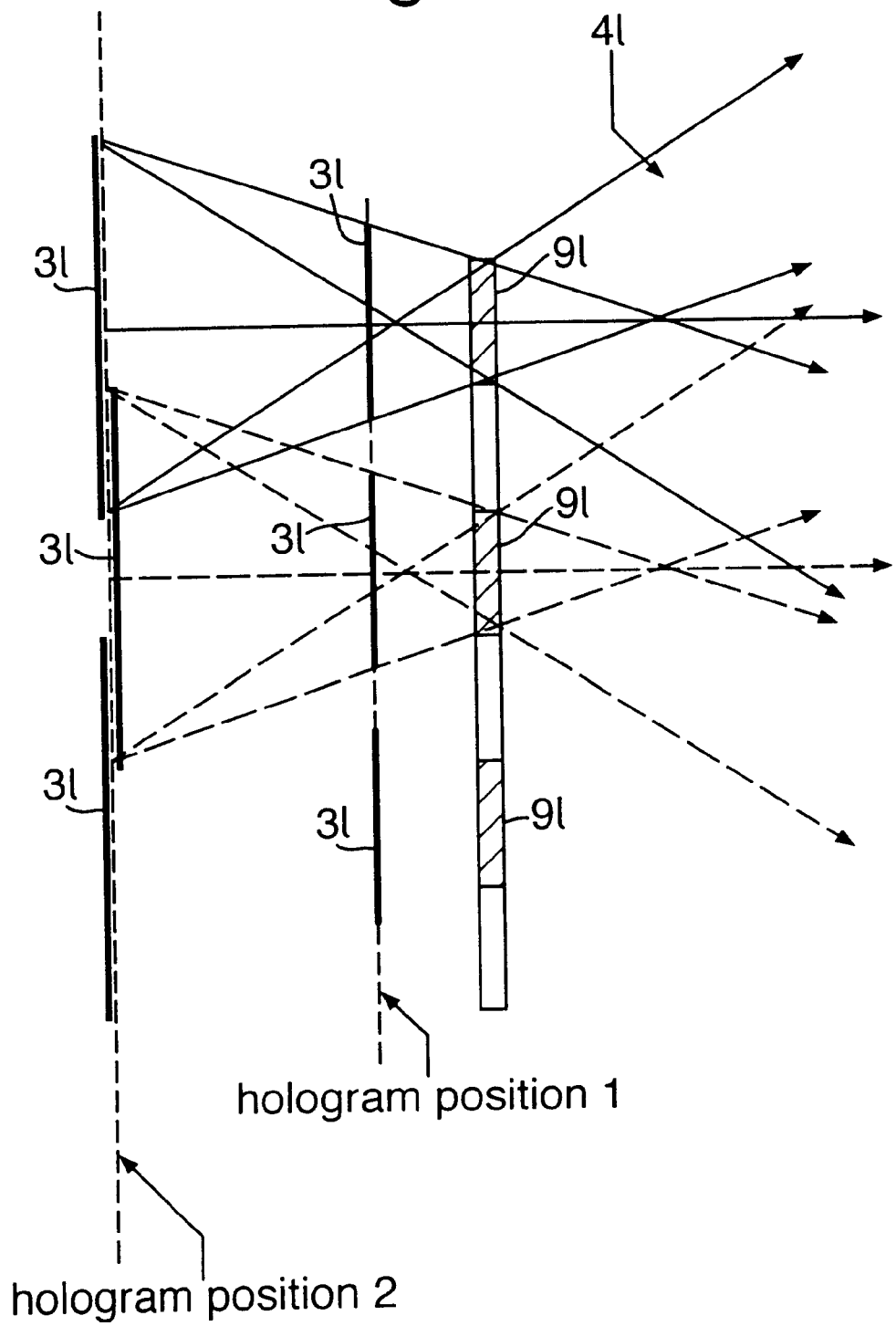

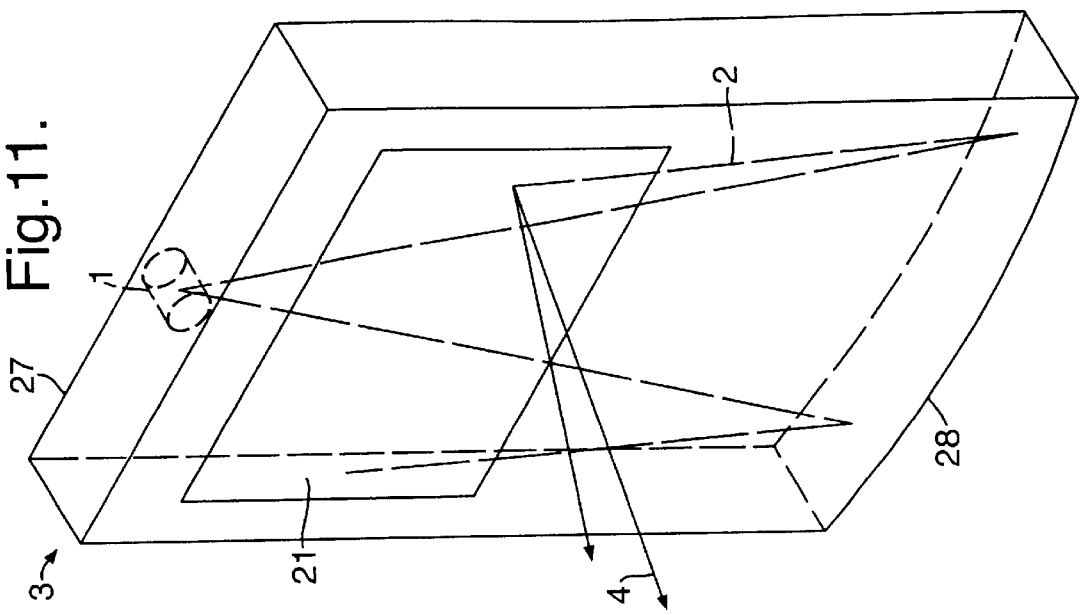
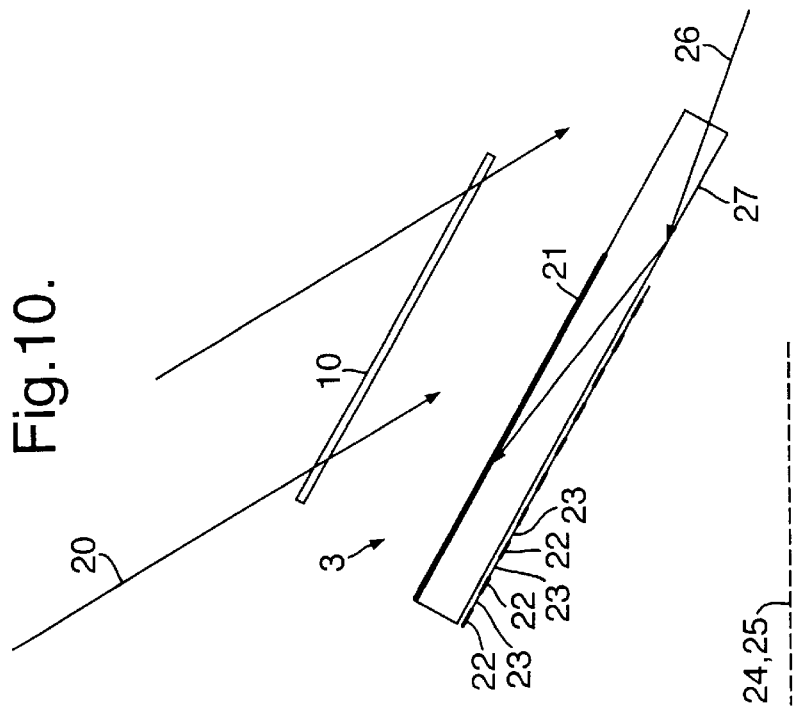

HOLOGRAPHIC OPTICAL ELEMENT

CROSS REFERENCE TO RELATED APPLICATION

This application is a continuation of U.S. patent application Ser. No. 09/628,224, filed Jul. 28, 2000, now U.S. Pat. No. 6,233,071, which is a divisional of U.S. patent application Ser. No. 08/750,364, filed Dec. 5, 1996, now U.S. Pat. No. 6,157,474, which is the U.S. national stage of PCT International Application No. PCT/GB95/01322, filed Jun. 7, 1995.

BACKGROUND OF THE INVENTION

1. Field of the Invention

The present invention generally relates to a display device, and more particularly to a display incorporating a holographic optical element.

Description of Background Art

In our earlier application WO93/02372 we describe a display device incorporating a holographic optical element. Light incident on the holographic optical element is directed to a single viewing zone. By moving the source of the light, the position of the viewing zone can be moved. Temporally alternating left and right images are projected on the screen from alternating positions whereby the images are viewable one after the other in respective left and right hand viewing zones.

SUMMARY OF THE INVENITON

According to a first aspect of the present invention, we provide a display device comprising a holographic optical element having at least two sets of hologram regions, the region(s) of the first set being interleaved or overlapping with adjacent region(s) of the second set(s) and being constructed such that light incident on each set of regions is diffracted so as to construct a respective one or more of a plurality of real or virtual images of a diffuse light source; and image generating means comprising a plurality of image elements; wherein the holographic element and its hologram regions are disposed and designed such that light diffracted by the first set of hologram regions passes through a corresponding first set of image elements and such that light diffracted by the second set of hologram regions passes through a corresponding second set of image elements.

According to a second aspect of the present invention, we provide a display device comprising a holographic optical element having at least two sets of hologram regions, the region(s) of the first set being interleaved or overlapping with adjacent region(s) of the second set(s) and being constructed such that light incident on each set of regions is diffracted so as to construct a respective one or more of a plurality of real or virtual images of a diffuse light source; and image generating means comprising a plurality of image elements; wherein the holographic optical element and its hologram regions are disposed-and designed such that light having passed through a first set of image elements of the image generating means is diffracted by the first set of hologram regions and such that light having passed through a second set of image elements of the image generating means is diffracted by the second set of hologram regions.

Each set may comprise a single region, which extends across a large proportion of the holographic optical element. Typically however, each set of regions comprises an array of regions.

Typically the regions making up an array are laterally offset from each other (e.g. vertically and/or horizontally).

Each region in an array is typically spaced from and does not overlap with adjacent regions in the array, although adjacent regions in the same array may overlap.

Also, each set of regions is typically laterally offset from the other set(s) of regions. The regions within an array may overlap with regions of other arrays. Typically however, the regions of each array do not overlap with regions of other arrays.

The at least two sets of regions may make up a lateral array of vertical or horizontal stripes, or a two-dimensional array such as a honeycomb.

In a preferable embodiment, the holographic optical element comprises two interleaved sets of regions.

Typically the holographic optical element is constructed such that each set of regions comprises a holographic recording of one or more diffuse light sources.

By making a recording of the same light source, or a number of different light sources in a plurality of different positions with respect to the holographic optical element, the light incident on the holographic optical element is directed to a position corresponding with the position(s) of the diffuse light source(s). Put another way, when each of the sets of regions is illuminated with light, the diffracted light forms an image of the one or more diffuse light sources. Typically the image is a real image although it may also be a virtual image.

Where each set of regions comprises a recording of only one diffuse source, then light incident on the set of regions will be directed to a single viewing zone. Where each set of regions comprises a recording of a plurality of diffuse sources, then light incident on the set of regions will be directed to a plurality of viewing zones.

The holographic optical element is typically a transmissive element, although it may be reflective.

The holographic optical element may be formed in any suitable way, for instance as a surface relief hologram made e.g. by moulding or embossing, or as a volume hologram made in e.g. photopolymer, dichromated gelatine or silver halide.

Typically the holographic optical element is provided as part of a display device such as a stereoscopic display device. This provides a particularly compact and easily constructed spatially multiplexed two or three-dimensional display device with holographically generated viewing apertures and capable of the display of images in real time.

Typically the display device is provided with image generating means defining a plurality of images each corresponding to a respective array of image elements (such as an array of LCD pixels). Typically the holographic optical element is also recorded with a holographic recording of an array of apertures. Where the element is incorporated in a display device, the array of apertures is arranged to coincide with arrays of alternating image elements in the display. By arranging the holographic optical element and the array of image elements in this way, light passing through the image elements is diffracted to a respective viewing zone by one of the sets of regions in the holographic optical element.

In a first example, the holographic element is placed adjacent to and in front (i.e. the viewer's side) of the LCD. The LCD may be backlit from a single source. Alternatively the LCD may be backlit from a number of sources grouped so as to be functionally equivalent to a single source.

The source or sources may be moved in order to move the positions of viewing zones. Alternatively the source may be static and its optical image moves (e.g. through the use of moving mirrors or a variety of other means). In a further alternative an array of static sources or a single elongated source with a controllable masking element may be provided so that the effective position of the source is moved by switching lights on/off or moving the masking element respectively.

Typically the LCD display carries a plurality of interleaved images (for instance in the form of a set of lateral stripes or in a honeycomb array).

The plurality of images may comprise the same view of a two-dimensional image if a two-dimensional display is required. In this case the source is preferably a plurality of laterally offset sources or a linear source—so as to overlap the left and right viewing zones thereby providing a full resolution 2D image to both eyes.

Typically however, the plurality of images comprise left and right-hand stereoscopic views. The regions of the holographic optical element typically correspond with the array of LCD image elements. The holographic regions corresponding to the left-hand image elements diffract the light to (and hence render the image visible from) a left-hand viewing zone and vice-versa for the right-hand image.

Alternatively the holographic optical element may be placed behind the LCD. In this case, the holographic optical element may be placed adjacent to the LCD, in which case the sets of regions will coincide with the array of the LCDs. However, if the holographic optical element is spaced from the LCD, then the regions of each set will typically overlap with regions from the other set, or even with regions of their own sets. In a limiting case, each set of regions may comprise a single region extending across the holographic optical element. However, the holographic optical element is still recorded and configured such that light, which passes through e.g. the left-hand LCD image elements, is only directed to the left hand viewing zone, and vice-versa.

The holographic optical element may be constructed in a number of ways as described more fully in the following specification. However, common features of the recording method are that, at some stage in the recording, an image of a diffuse light source is recorded with the light source in a plurality of positions with respect to the holographic plate, each position relating to a respective viewing zone.

The holographic optical element may be recorded in a "one step" process in which a diffuse light source is recorded in a plurality of positions in two exposures.

Typically however, the holographic optical element is recorded as a transfer hologram from one or more master hologram plates.

Another common feature of the holographic recording process is that at some stage in the process, a mask (corresponding to the array of LCD image elements in the display device) is used in the recording process. The mask may be placed adjacent to the holographic plate in the recording of either the master hologram or the transfer hologram. Alternatively, the mask may be placed a distance from the holographic plate in which case it can be considered that a holographic recording is being made of the viewing apertures created by the mask.

The holographic optical element may be constructed as a substrate guided wave device.

In addition, the display device may further comprise a focusing optic, which creates a virtual image of the array of image elements and the holographic optical element and forms real images of the viewing zones. In such a case the image of the diffuse light source produced by the holographic optical element might advantageously be formed as a virtual image in the first instance.

BRIEF DESCRIPTION OF THE DRAWINGS

A number of embodiments of the invention will now be described with reference to the accompanying drawings, none of which are to scale, in which:

FIG. 3 is a schematic view of a first display device in which the holographic optical element is placed in front of the LCD;

FIG. 4 is a schematic view of a second display device in which the holographic optical element is placed behind the LCD and comprises an array of overlapping regions;

FIG. 4A is a schematic view of a display device illustrating the effect of varying the separation between the hologram and the LCD;

FIG. 10 illustrates a second example of a substrate guided wave transfer hologram;

FIG. 11 illustrates a display device incorporating the substrate guided wave holographic element illustrated in FIG. 9 or FIG. 10;

DETAILED DESCRIPTION OF THE INVENTION

The embodiments described allow the display of images in two or three dimensions. The display is autostereoscopic and can display full color, moving 3D images in real time. It is based on a two dimensional image bearing medium such as a photographic transparency or an electronic display such as a Liquid Crystal Display (LCD) used in conjunction with a novel holographic device and lighting system. In the following description we will presume that the image bearing panel is a LCD.

Figure 1:
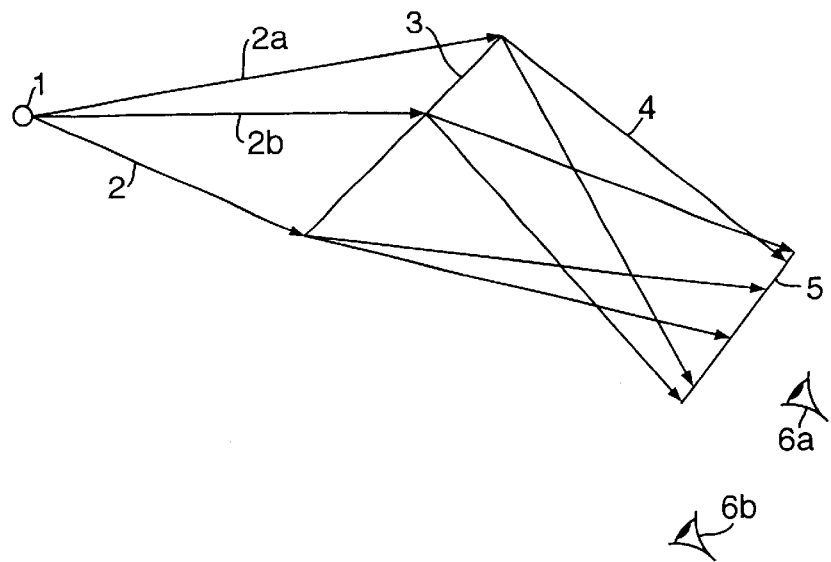
FIG. 1 illustrates a holographic optical element according to the invention.

Referring to FIG. 1, light source 1 emits light 2 which illuminates a hologram (i.e. holographic optical element) 3, which diffracts the light in such a way as to reconstruct the wavefront 4 which forms an even and diffusely illuminated real image 5.

The zone defined by the real image 5 may be considered to be a diffusely illuminated plane at a distance from the hologram 3. In principle (and ignoring the zero order which passes straight through the hologram) none of the light 2 is diffracted outside of the zone 5.

When a point on the hologram 3 is viewed by an eye 6 it will appear to be bright if a straight line drawn through it and the eye 6 passes through zone 5. Conversely it will appear dark if a straight line drawn through it and the eye 6 does not pass through zone 5.

The first case is illustrated by eye 6a, which perceives all points on hologram 3 as being bright and the second by eye 6b for which the whole surface will be dark.

This principle applies both in the illustrated case where the zone 5 is a real image and in a case where the zone is a virtual image (i.e. when it is an image which appears to form on the far side of the hologram 3, as viewed by the eye 6.)

The holographic techniques to be described below permit the reconstruction of image 5 in such a way that the light distribution is even across its whole area and its borders can be precisely defined. This is advantageous in autostereoscopic applications as it assists in the reduction of crosstalk between left and right views without the converse problem of creating a dim or blank zone separating the left and right viewing zones.

Figure 2:
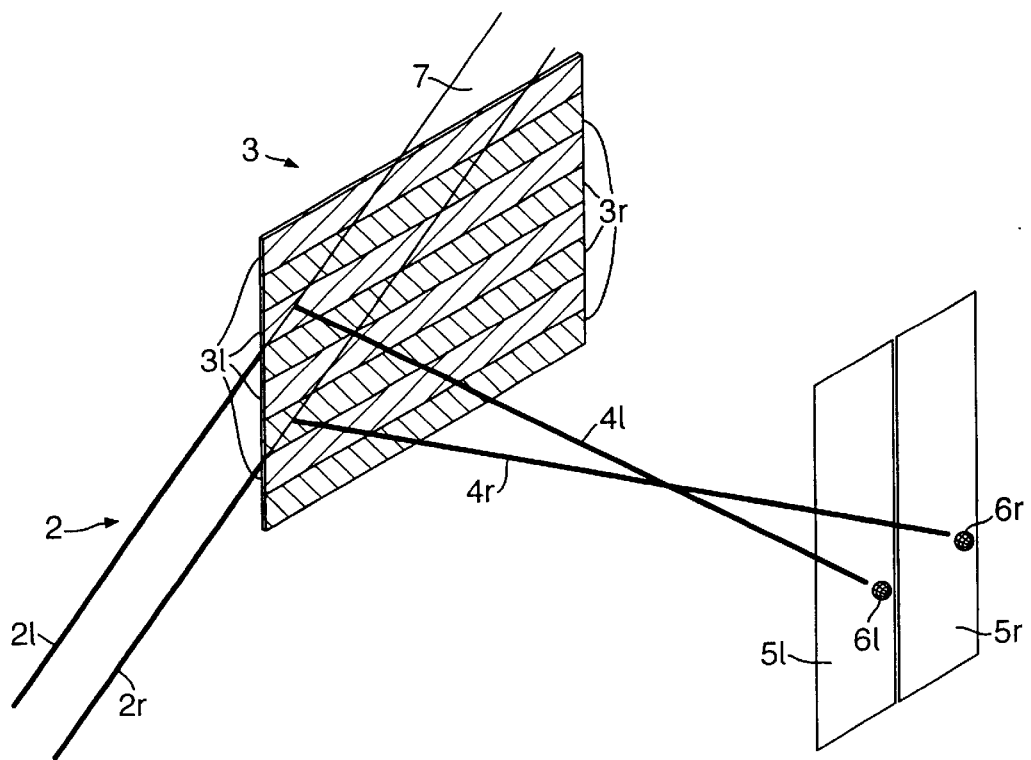
FIG. 2 is a perspective view of a holographic optical element according to the invention constructing a left hand and right hand viewing zone.

Considering now the perspective drawing FIG. 2 (which is not to scale): light rays 2 shine on the spatially divided hologram 3 which consists of a set of sections 3l the members of which all reconstruct real image 5l; and a set of sections 3r the members of which all reconstruct real image 5r. It will be noticed that the real images 5 are precisely located in space and they can be made so that they butt up to each other with neither a gap nor overlap between them.

Imagine the whole surface of the hologram 3 evenly illuminated by rays 2 and consider the two exemplary rays 2l and 2r (both of which may be considered to originate at the same light source 1 (FIG. 1)). Ray 2l is an exemplary member of the set of rays that strike the zones 3l of the hologram 3. Some of the light 2l is not diffracted and continues on in the zero order light 7 (which is of little interest here). The diffracted light (illustrated by the example ray 4l) reconstructs the diffuse real image 5l. Similarly the ray 2r is diffracted by the hologram section 3r reconstructing the real image 5r.

An eye 6l is positioned such that all straight lines drawn through the eye 6l to any point on the hologram 3 will pass through the zone 5l; eye 6l will consequently see all the sections 3l of the hologram 3 light up, at the same time all the sections 3r will remain dark for eye 6l as the same imaginary line does not pass though the zone 5r reconstructed by the areas 3r of the hologram 3. The converse applies in the case of the eye 6r, which will see the areas 3r light up and the areas 3l will be dark.

If the eye 6l is a viewer's left eye and 6r is the same viewer's right eye then each eye sees a different part of the hologram 3 light up. Specifically, eye 6l will perceive every member of the set of sections 3l to be bright and every member of the set 3r to be dark. The converse applies for eye 6r.

Up to this point we have presumed that the illumination of the hologram 3 by light source 1 has been even and there has been nothing to vary the perceived intensity of the light diffracted towards the images 5. The screen is in effect blank. But the light impinging on the hologram 3 can be made to pass through a LCD (liquid crystal display). If the display is appropriately made there will be sections of the LCD lying on straight lines drawn through the optical position of the light source 1 and the sections 3l of the hologram 3 and others on lines from source 1 and sections 3r.

If those sections of the LCD thereby corresponding to sections 3l of hologram 3 display a certain image L while those corresponding to sections 3r display a second image R it will be clear that eye 6l will see image L while eye 6r will see image R. If the two images L and R are the components of a stereo pair then a stereoscopic three-dimensional picture can be seen.

Similarly the light may be modulated by placing the LCD on the other side of the hologram. In this case the light 2 is first diffracted by the hologram and then passes through the LCD. In this case the hologram and light combination may be considered a sort of backlight. The light 4l forming image 6l will pass through certain sections of the LCD which may be arranged to display image L, the light 4r passes through other sections displaying image R. In this way the two eyes 6l and 6r again see separate pictures, which may combine through stereopsis to show an image in three dimensions.

There are applications which will require the images 5l and 5r to form first as virtual images, in particular this may apply where a display of this sort is used with another focusing optic which will create a virtual image of the LCD and Hologram 3 combination and bring the images 5r and 5l in front of the optic as real images. Such an arrangement is described in greater detail below.

We can now describe the nature of a number of embodiments of the invention in greater detail. (We will describe the case where there are just a pair of images to be displayed, more can be displayed by appropriate changes. Similarly we will consider only one light source, though several may be used. We will consider just one stereo viewing position while knowing that more can be provided and we will consider the essential elements and ignore the fact that other optics—mirrors, lenses, holographic optical elements—may be included in order to assist in the practical construction and operation of the display.)

For the purposes of this discussion the composite hologram 3 may be considered to be composed of sets of 'apertures' HL and HR such that light impinging (at an appropriate angle of incidence) on any member of the set HL reconstructs one image and light impinging on a member of the other set HR reconstructs a different image. These images form at a distance from the plane of the hologram 3 and may be virtual or real. According to the precise geometry these two sets of apertures HL and HR may or may not overlap.

The two images 5l and 5r formed respectively by the two sets of apertures HL and HR are evenly illuminated diffuse areas of light and may themselves be considered as apertures IL and IR, where IL is reconstructed by set HL and IR by set HR.

Combined with the hologram is a LCD panel which will display two pictures A & B. The pixels of this LCD may also be considered as apertures and maybe divided into two sets PL and PR; where the set PL displays picture A and the set PR picture B.

In addition a pair of apertures represent the viewer's two eyes. The left eye of the viewer is aperture EL and the right one is ER. The apertures (or images thereof) IL and IR form at a distance from the hologram 3 and in the same general region as the eyes EL and ER. Optimum operation of the display may be defined as the case where light rays can be traced back from EL to the light source 1 such that they pass through aperture IL, all members of the set of apertures PL and all members of the set of apertures HL, but not necessarily in that order. At the same time no rays should be traceable from EL though IR, PR and HR to the source 1. Similarly rays traced from ER must pass through IR, PR and HR and not through IL, PL and HL.

Two important configurations are illustrated in FIG. 3 and FIG. 4 which are enlarged details of a section through the hologram 3 and the LCD 8. (The FIGs. are not to scale.)

FIG. 3 represents a case where the hologram 3 is on the viewer's side of the LCD 8. It can be seen that a ray of light 2*l* first passes through a pixel which is a member of the set of pixels 9*l*, it then strikes the hologram 3 in the position of a portion of the hologram 3 which is a member of the set of sections 3*l*, it is then diffracted. The zero order 7 passes straight through the 1st order wavefront is represented as rays of light 4*l* and reconstructs the image of the zone 5*l*. The same applies mutatis mutandis to rays 2*r*, pixel set 9*r*, hologram section set 3*r*, diffracted rays 4*r* and image 5*r*. The hologram 3 and LCD 9 should be mounted close to each other and such that all the rays passing through pixels set 9*l* will reconstruct only image 5*l* and similarly the rays passing through pixel set 9*r* should form only image 5*r*. This end may be assisted by introducing blank areas in the hologram 3 between the members of the set 3*l* and those of 3*r*.

Moving to FIG. 4: in this case, also from the viewer's position, the hologram 3 is mounted behind the LCD 9. It should first be noted that the hologram described in relation to FIG. 3 can also work in this situation provided the optical path length between the holographic surface and the pixels of the LCD is kept small (in practice usually not greater than about four times the pixel spacing). FIG. 4 does, however, represent an improved arrangement which allows for some increase in separation of the hologram 3 and the pixels of the LCD 9.

Light 2 strikes the hologram 3. Where it strikes a section of the hologram, which is a member of the set 3*l* it is diffracted in such a way as to pass first through a member of the set of pixels 9*l* and then on to reconstruct the image 5*l*. The same applies mutatis mutandis to light striking an area of the hologram containing a member of the set 3*r*. It will be noticed in this case that the members of the set 3*l* overlap spatially with members of the set 3*r*. It is even conceivable that they would also overlap with members of their own set. It should also be noticed that the display can be configured so that every member of the set of pixels 9*l* receives light only from hologram elements members of the set 3*l* and that similarly every member of the set of pixels 9*r* receives light only from hologram elements members of the set 3*r*.

The overlapping of members of the same set is illustrated in FIG. 4A. FIG. 4A shows some light rays 4*l* traced through the hologram and LCD. If the separation is relatively small (hologram position 1) the different members of the same set 3*l* will not overlap each other (though in the illustrated case they would overlap members of the other set 3*r* which are omitted from the drawing). If the separation is increased (hologram position 2) we find that they overlap on each other as the zones occupied by each member of the set widen.

We will now describe some of the practical characteristics of a display made according to this method.

We have described elsewhere (PCT/GB 93/01709) how the position of a viewing zone for a holographic autostereoscopic display may be moved by moving the effective position of the light source. This principle may be applied here in the following basic ways:

The viewing zone may be moved by moving the position of the light source thereby allowing the display to be controlled so that the viewer may move without loss of stereo effect. If the stereo viewpoints of the displayed images are appropriately updated the impression of parallax can be provided allowing the viewer to look around and even above and below and closer and further with the parallax of the image changing accordingly.

Separate sources may be provided thereby creating two or more separate stereo viewing zones so that more than one person can enjoy the stereo effect at a time. In this case the effective position of each of the separate sources may also be movable thereby allowing each viewer mobility.

In the above the effective position of the source(s) can be changed so as to compensate for the viewer(s) changing positions side to side, up and down and in distance. In practice the side-to-side movement is likely to be the most important.

Separate sources or an extended source may be provided to overlap the zones 5*l* and 5*r* over each other thereby allowing both eyes to see all the pixels of the LCD. This procedure is advantageous as it displays a full resolution 2D image to both eyes thereby allowing conventional two dimensional pictures to be used and enjoyed without any compromise to their quality—this is particularly helpful for all conventional 2D uses of such a display. Clearly with this illumination the autostereoscopic capability is temporarily disabled. Such capability is easily turned on and off either automatically or manually.

An additional conventional diffuse backlight may be provided, this will be located behind the hologram 3 and behind the LCD (seen from the viewer position). Such an arrangement will provide an alternative method of achieving 2D operation. This is most conveniently achieved if the hologram 3 is made as a Substrate Guided Wave (SGW) hologram.

We will now describe one method of making the hologram 3 and indicate some of the many variations on the technique. We will concentrate on the essentials leaving out many parts relating to the optical geometries that may be used and which will be familiar to holographers.

We will first describe the making of a first generation hologram or H1.

Figure 5:
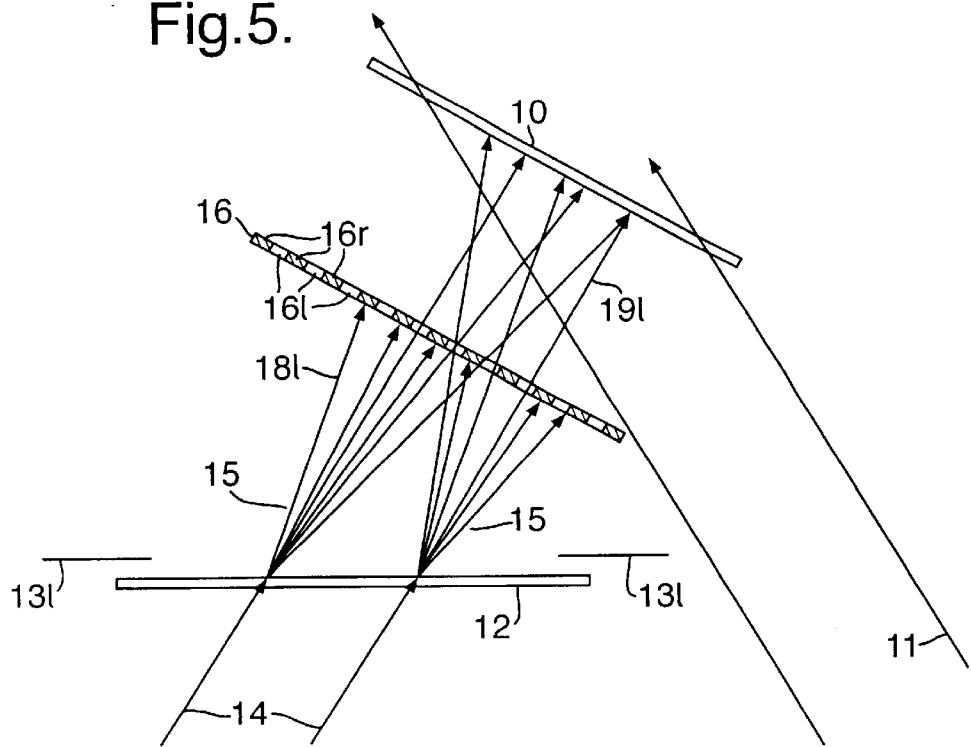
FIG. 5 illustrates the recording of a master holographic plate for a holographic optical element according to the invention.

Referring to FIG. 5 (which is a schematic view and is not to scale) a holographic plate 10 is exposed simultaneously to a reference beam 11 (preferably collimated) and to the object light 19*l*. The required object light 19*l* is produced by illuminating a diffuser 12 (e.g. a ground glass screen) with a beam of light 14; the extent of the diffuse area visible to the plate 10 is restricted by mask 13*l*; light 14 is scattered by the diffuser 12 towards mask 16; some rays 18*l* of the scattered light 15 impinge on the opaque areas 16*r* of mask 16 and are blocked; other rays 19*l* pass unimpeded through the clear areas 16*l* of mask 16 and then impinge on the holographic plate 10 where they interfere with the reference beam 11, the interference fringes thereby produced are recorded in the normal way. This constitutes the first exposure of master hologram 10.

A second exposure is then made with the mask 13*l* replaced with mask 13*r* (which might be mask 13*l* translated by, e.g. its own width) and with mask 16 replaced with mask 17 (which might be mask 16 translated e.g. by a distance corresponding to the pixel spacing of the LCD 8 (FIG. 3)).

It should be understood that the mask 16 is made specifically for the LCD that will be used in the finished autostereoscopic display. The set of opaque mask areas 16r correspond in position and spacing to pixel set 9r; the set of clear areas 16l correspond to pixel set 9l. Mask 17 (FIG. 7) is of near identical fabrication where the opaque areas 17l correspond in position and spacing to pixel set 9l; the set of clear mask areas 17r correspond to pixel set 9r. Masks 13l and 13r are used to define the respective viewing apertures 5l and 5r (FIG. 2) respectively.

Figure 6:
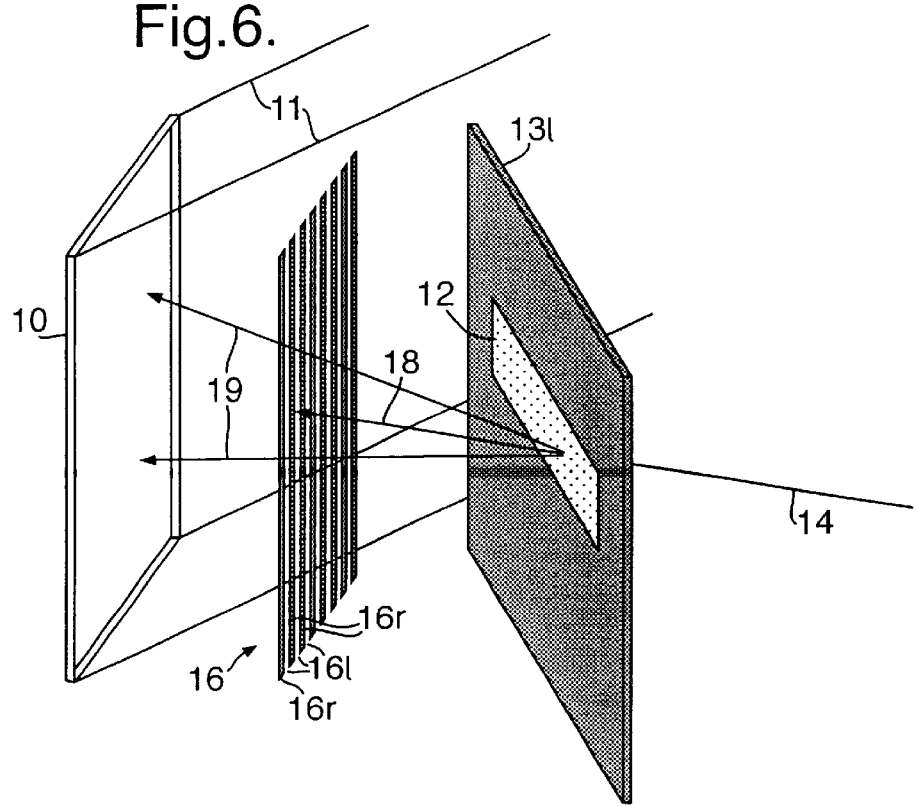
FIG. 6 illustrates the recording of the left hand viewing zone on the master holographic plate.
Figure 7:
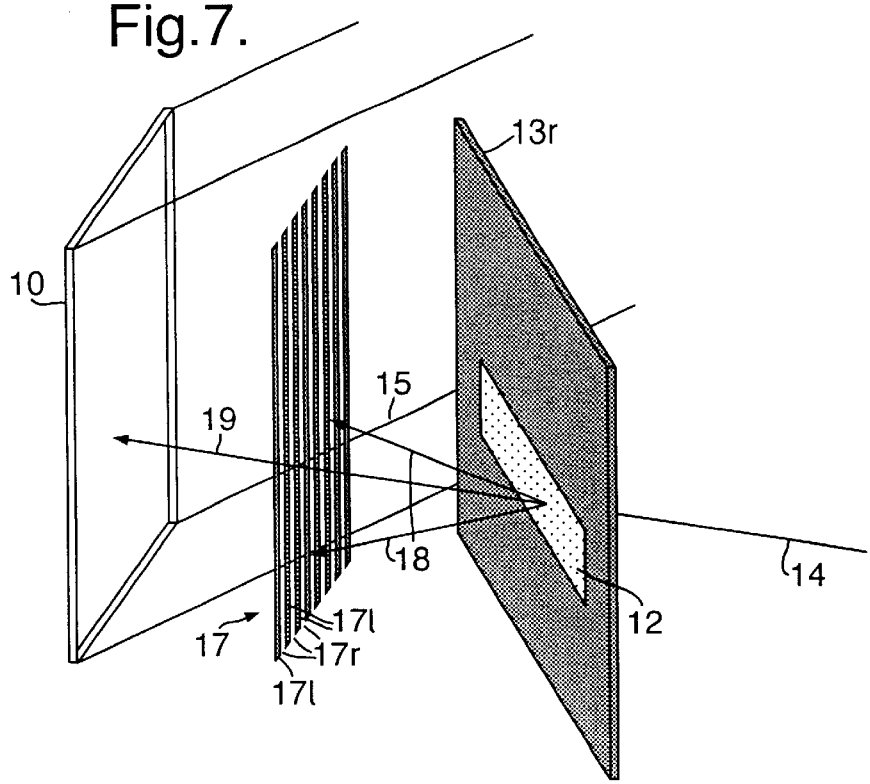
FIG. 7 illustrates the recording of the right hand viewing zone on the master holographic plate.

A configuration for the two exposures is shown in FIGS. 6 and 7, which are schematic perspective drawings and are not to scale. They represent the various elements as they would most likely appear on a an optical table—i.e. with everything turned on its side so the plane containing the (horizontal) optical axis will be the same as that containing the (vertical) optical axis in actual use.

FIGS. 6 and 7 should be contrasted. After the first exposure shown in FIG. 6 the mask 13l is replaced with mask 13r (FIG. 7) (or, which is equivalent, the mask 13l will be translated downwards by its own width). Similarly the mask 16 is replaced by mask 17 (or, which is probably equivalent, the mask 13l will be translated horizontally so that the clear areas 17r are in the same position as that previously occupied by the opaque areas 16r). A second exposure is then made (either on the same holographic plate 10 or on a second plate, in the following we will continue to assume that just one double exposed H1 hologram is to be used). The hologram is then processed in the conventional way for the best signal to noise ratio.

Figure 8:
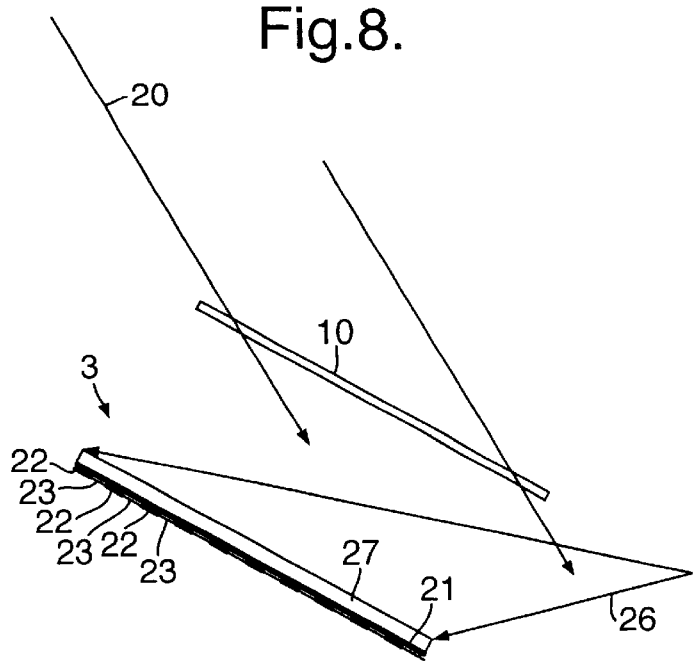
FIG. 8 illustrates the recording of a transfer hologram from the master hologram recorded in FIGS. 6 and 7.

The H1 hologram is then used to make an image planed H2 hologram 3 as illustrated in FIG. 8:

H1 hologram 10 is replayed with beam 20, which is the conjugate of the reference beam used in the recording. It reconstructs a real image composed of:

Real image 24, which is the image of the diffuser 12 (FIGS. 5–7) as masked by the mask 131 (FIG. 5).

Real image 25, which is the image of the diffuser 12 (FIGS. 5–7) as masked by the mask 13r (FIG. 7).

Real image 22, which is the image of the mask 16 (FIG. 6).

Real image 23, which is the image of the mask 17 (FIG. 7).

It will be appreciated that the images 22 and 23 are images of opaque, therefore dark, objects. The effect of these images 22 and 23 is to limit the positions whence the images 24 and 25 may be seen—as will be clear from considering the recording geometries described above.

In addition there is provided holographic material (say plate) 3 comprising a substrate 27 and a suitable photographically sensitive layer 21. There is also a reference beam 26 for the plate 3, which in the illustrated case is diverging but need not be so. The sensitive layer 21 would normally be applied to the face of the substrate 27 placed closest to the real images 22 and 23. The optical distance between the holographic layer 21 and the images 22 and 23 should be the same as the optical distance between the layer 21 and the plane of the pixels 9 of the LCD 8 (FIG. 3) in final use.

(Note on aberrations: in this configuration accurate reconstruction is important. All the conventional precautions should be taken e.g., the reconstructing beam 20 should be an exact conjugate of the reference beam 11, the H1 hologram 10 should be flat, and the processing of the hologram 10 should not introduce dimensional change in the sensitive layer. In addition aberrations caused by the thickness of the substrate 27 to the H2 holographic plate 3 may have to be pre-corrected by introducing a plate of similar optical properties to the H23 and in the same relative position with respect to the H110 in the recording of the H110. Similar pre-correction techniques might be required to compensate for refraction in the LCD substrate).

The holographic plate 3 is exposed and processed for good diffraction efficiency with minimum noise. Holographic plate 3 may then be used in an autostereoscopic display. When it is replayed with light source 1 (where in the described case the angle of incidence of light 2 will illuminate it at roughly the same angle as the angle of incidence of the reference beam 26) it will reconstruct images 5l and 5r (FIG. 2) which are themselves images of images 24 and 25 which in turn are images of diffuser 12 seen through apertures 13l and 13r (FIGS. 5–7). In this case the LCD 8 (FIG. 3) is disposed close to the hologram 3 such that images 22 and 23 (which are images of masks 16 and 17 (FIGS. 6 and 7) form within or very close to the pixel sets 9l and 9r (FIGS. 3 and 4) respectively and without light forming image 5l (FIG. 2) passing through any member of pixel set 9r (FIGS. 3 and 4) nor light forming image 5r (FIG. 2) passing through any member of pixel set 9l (FIGS. 3 and 4).

There is a choice of holographic materials that may be used in all the above stages e.g. silver halide, dichromated gelatine, photopolymer, photo resist, thermoplastic, the optical arrangements are essentially the same for all suitable materials including, presumably, ones that axe yet to become available.

The H23 can be used as a tool to replicate functionally identical holograms. Optical methods can be used—in particular contact copying, alternatively mechanical methods such as embossing and moulding may also be used. In the mechanical cases the H23 would be made so that the interference pattern was recorded in the form of a surface relief structure, which after a number of known intermediate stages, becomes a moulding or stamping tool. Moulding is particularly attractive if other optics are to be incorporated into one moulded unit—e.g. in the case where the H23 is made as a Substrate Guided Wave (SGW) hologram. As has already been mentioned the described method of recording the Hologram 3 is only one of many possible methods to achieve the desired effect. There exist one step methods (whereby the hologram 3 is made directly, without the need for the step involving H110). There also exist variations when the hologram 3 is to be placed between the LCD 8 and the viewer (the configuration illustrated in FIG. 3) in which case an obvious variation is to place the holographic plate 3 on the other side of the image 22 and 23 but with the sensitive layer still being disposed closest to the image 22 and 23. Once the basic principles have been understood a competent holographer would be able to design a range of methodological variations with relative ease. The aforesaid notwithstanding we will now summarise some variations and some important design considerations:

The hologram 3 can be produced by making a first master hologram with the diffuser in a first position associated with the left viewing zone, and a second master hologram on a different holographic plate with the diffuser in a second position associated with the right viewing zone. The hologram 3 is then recorded as a transfer hologram from the two master holograms. The first master hologram is recorded as a transfer hologram with a mask of alternating dark/opaque lines masking the transfer hologram plate. The mask is then moved to uncover a different set of lines on the transfer hologram plate and the second master hologram is recorded onto the transfer hologram plate.

Holograms operate by diffraction and can produce pronounced chromatic dispersion. It is important to control this effect otherwise the performance and/or usability of the display will be very severely compromised. The use of a viewing zone formed as the diffuse image described allows the use of some simple methods to counteract the otherwise detrimental effects of chromatic dispersion. In e.g. FIG. 8 it will be noted that the plane of the diffuser aperture images 24 and 25 is inclined with respect to the hologram 3. It is advantageous to use the angle of inclination known to holographers as the achromatic angle whereby the spectra of chromatically dispersed image points overlap each other forming a largely achromatic image which is sharp in depth and from side to side.

Figure 7A:
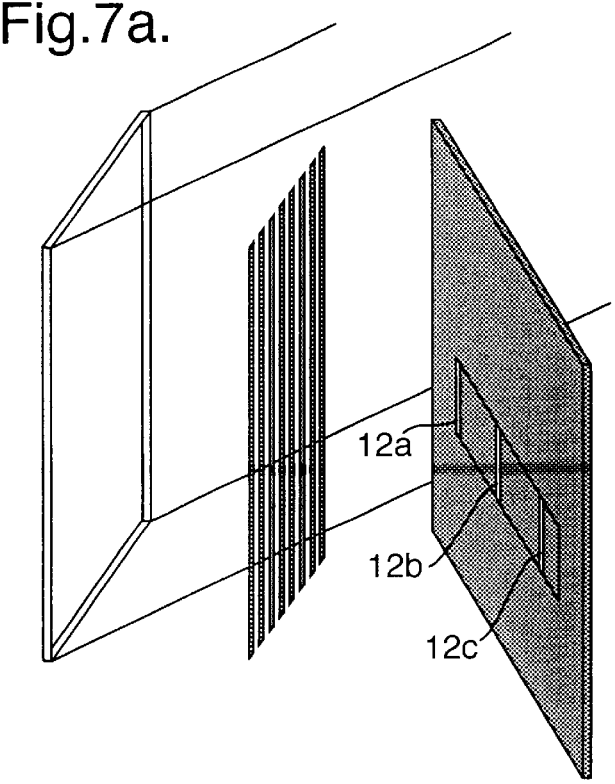
FIG. 7a illustrates an alternative diffuser arrangement for the recording of a viewing zone on the master holographic plate.

There is a variation on this approach (FIG. 7a refers) where instead of using a homogeneous inclined diffuser 12 a similar effect may be produced by using a plurality of diffuse lines of light 12a, 12b, 12c. etc. These are disposed so that each line lies in a plane inclined at the achromatic angle, their length equals the width of the plane diffuser(s) that would otherwise have been used. They are advantageously disposed parallel to the plane of the hologram and perpendicular to the plane of incidence of the illuminating light. When such an arrangement is illuminated by white light each line is chromatically dispersed into spectrum that is inclined at the achromatic angle, the respective spectra of each of the diffuse lines overlap so as to produce an area where the color mix thereby produced renders a diffuse white ("achromatic") zone functionally identical (under white light illumination) to the zone produced by a homogeneous diffuser.

The lines 12a . . . 12n (FIG. 7a) will have to be diffuse so they can be considered diffuse zones.

The most important general point is that the images of diffuse zones with appreciable width and height must be reconstructed at a distance from the hologram. The zones should be precisely located in distance from the hologram (i.e. minimal blurring along the z-axis). They should be evenly illuminated (i.e. substantially the same brightness across their functional width) and no significant blurring in the horizontal direction (i.e. the direction perpendicular to the plane of incidence of the illuminating light). The devices described herein allow all these important performance criteria to be achieved. Failure to achieve any of them leads to restriction of the available stereoscopic viewing zone and the introduction of highly undesirable artifacts such as color fringing and crosstalk between the left and right channels. A substantial region of achromatic response up and down is usually required but it will be appreciated that the appearance of color distortion at the vertical extremes of the viewing zone is not a significant practical problem.

The use of the achromatic angle is one of several methods used to deal with the effects of chromatic dispersion.

If the H1 10 and H2 3 are made with a diffuser aperture 13 arranged at an angle that is not close to the achromatic angle then other means of dealing with chromatic dispersion must be used (unless, that is, the display is to be use to display monochromatic images and the light source 1 has a narrow spectral bandwidth). Alternative methods include:

Full color holography using a thick holographic recording medium where the Bragg's angle condition of the hologram 3 effectively suppresses all but the desired range of wavelengths. This is practical with both reflection and transmission versions of the hologram 3.

Reconstruction of hologram 3 with a plurality of narrow spectral bandwidth light sources 1r, 1g, and 1b where the sources may or may not be disposed so that they each have different angles of incidence arranged so that the reconstructed images 5r, 5g, and 5b overlap in space with sufficient precision.

Use of dispersion compensation techniques in the replay of hologram 3, this involves the use of at least one other diffractive optical element (typically one made using holographic techniques) designed and disposed to introduce equal and opposite chromatic dispersion. This arrangement will often require (a) that the aggregate optical power of the hologram 3 and the additional optical element should be low and (b) the use of an additional optical element (e.g. an lens or mirror) with positive optical power, in addition a louvered screen may also be required between hologram 3 and the additional diffractive optical element in order to suppress the zero order which might otherwise be visible to the viewer.

Use of an additional holographic/diffractive optical element which provides several beams of light 2r, 2g, and 2b focused differently so that the respective red, green, and blue images of the viewing apertures 5 (FIG. 5) overlap with sufficient precision.

An interesting variation on a previous configuration is to complicate the recording process as follows: Three diffuse lines are used (corresponding to 12a, 12b, 12c in FIG. 7a), these should be disposed so that from a given viewing position their respective dispersed images are seen as red, green and blue—the aggregate being white. As well as being divided between pixel sets 9l and 9r they are also divided between pixel subsets 9l red, 9l green, and 9l blue and 9r red, 9r green, and 9r blue in such a way that the pixels of LCD 8 will be divided providing red, green or blue images to the left eye and similarly red, green or blue images to the right eye. When used in conjunction with a grey scale LCD addressed much as if it were a color LCD, then the displayed image will also be in full color. The color rendition will be very similar to that displayed by "full color" "rainbow" holograms such as the popular embossed holograms in current use. If a reflection hologram is used the color rendition will be more stable in the vertical direction. This method is certainly complicated by the fact that 6 masks (16 red, 16 green, 16 blue, 17 red, 17 green and 17 blue) are required but is nevertheless perfectly feasible.

Figure 15:
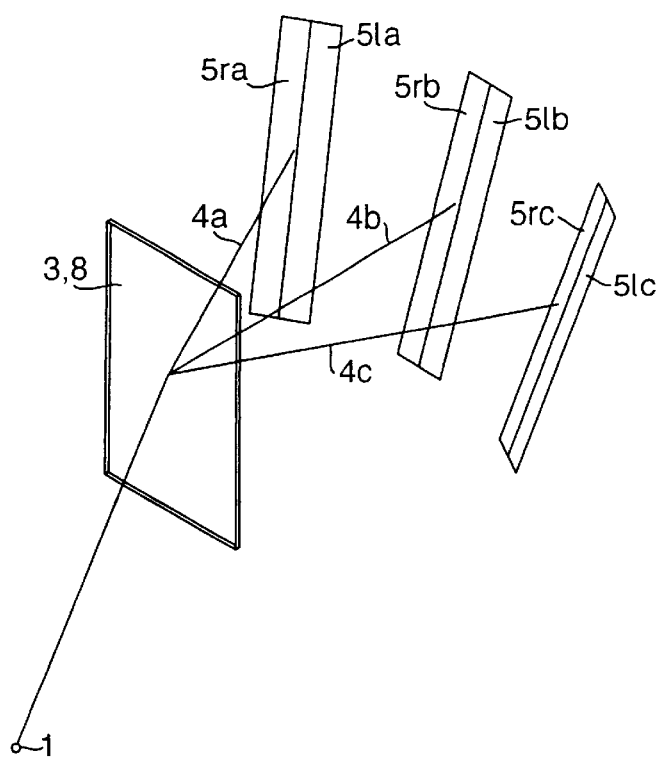
FIG. 15 illustrates the simultaneous formation of a number of stereoscopic viewing zones.

In the preceding descriptions it has been assumed that when the hologram 3 is illuminated by a single light source then one stereoscopic viewing zone will be created. It is possible to make the hologram 3 in such a way as to provide a plurality of such positions without recourse to multiple light sources. This requires the recording of a plurality of diffuse zones for each left and right view. In all other respects the holographic methods are the same. FIG. 15 illustrates the end result where light source 1 illuminates the LCD and hologram combination 3 and 8. In this case the hologram 3 has been made with diffusers in three positions for the left viewing zone and in corresponding three positions for the right viewing zone. In use the images of these diffusers reconstruct to form three separate stereo viewing zones where the left and right pair 5la and 5ra form in one position thereby providing one stereo viewing position while the other pairs 5lb, 5rb and 5lc, 5rc simultaneously form two further stereo viewing positions. It will be obvious that the distance and height of each of stereo viewing positions from the hologram 3 need not be identical and that any number of such stereo viewing positions can be provided.

There are a number of ways of making the H2 3, which are worthy of discussion here.

The case described above and drawn in FIG. 8 uses the well know off axis transmission hologram technique where the reference beam 26 and reconstructing beam 2 illuminate the hologram 3 through free space (notwithstanding the introduction of mirrors or lenses to assist in the optical performance and/or practical construction of the display). An alternative is to use a substrate guided wave (SGW) technique where the light beam is guided by the hologram substrate 27, frequently by using the phenomenon of total internal reflection.

Figure 9:
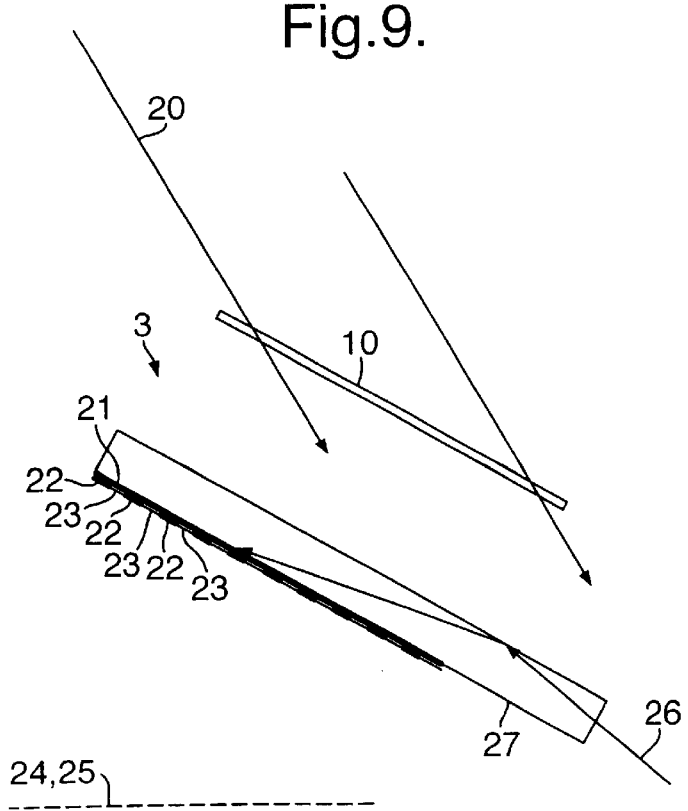
FIG. 9 illustrates the construction of a substrate guided wave transfer hologram from the master hologram recorded in FIGS. 6 and 7.

Two basic arrangements are illustrated in FIGS. 9 and 10 (these drawings are not to scale). In comparing these to FIG. 8 it will be noticed that the reference beam (here represented by just one ray 26) enters the substrate 27 of hologram 3 by way of a bevelled edge. (It will be understood that there are a number of other ways of coupling the beam 26 into the substrate including prisms and diffraction gratings.) The beam then suffers internal reflection and impinges on the sensitive layer 21 where it interferes with the object light to create a transmission type hologram. FIG. 10 illustrates the same configuration but with the sensitive layer 21 located on the other side of the substrate 27, such an arrangement produces a reflection hologram which, for full color use, should be operate in three appropriately chosen wavelengths.

As well as producing a more compact display the SGW mode can be used to introduce other optical elements, which if the holographic surface in a mechanically reproduced version is in the form of a surface relief, allow for very economical manufacture and complex optical performance. We will highlight a few possibilities.

FIG. 11 is a perspective view of a SGW transmission hologram 3 (but can, mutatis mutandis, be in reflection mode). The light source 1 is mounted in or adjacent to the hologram 3, which comprises the holographic surface 21 and a substrate 27 with further optical properties. The light 2 emitted by the source 1 passes down through the substrate 27 until it strikes the bottom surface 28 which is curved and equipped with a reflective coating. The beam 2 is then reflected, focused and directed towards the holographic surface 21 where it is diffracted forming wavefronts 4 which forms images 5*l* and 5*r* (FIG. 2) as previously described. It will be appreciated that we have only illustrated certain rays of light for the purpose of clear illustration. The configuration shown in FIG. 11 has a number of practical advantages. It can be made as one unit by moulding techniques where the holographic surface 2*l* can be created as a relief structure in the moulding process. The light beam 2 can be focused using the moulded structure, both by the mirrored surface 28 and (which is not illustrated) at the point of insertion into the substrate 27. A plurality of light sources can be used to enable the viewing zones 5 to be moved providing the ability to track a moving viewer and allowing full resolution 2D operation.

As an alternative to using multiple sources for 2D compatibility a conventional diffuser backlight can be provided behind the hologram 3 which will be clearly visible through the holographic surface 21 and the substrate 27. Such a system can be economic in manufacture as well as being robust and compact.

Figure 12:
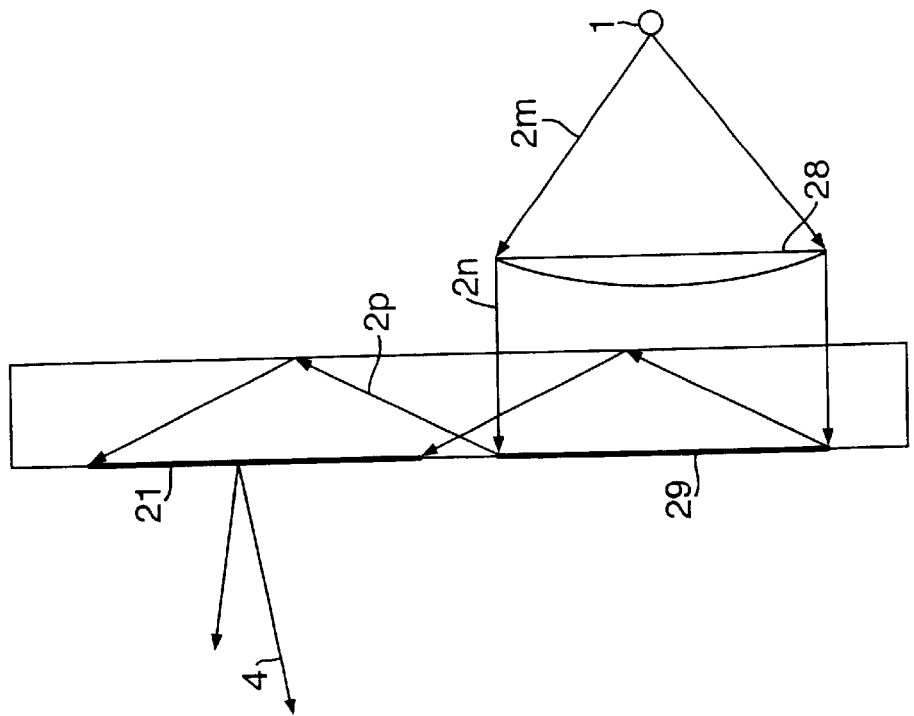
FIG. 12 illustrates a further example of a holographic optical element constructed as a substrate guided wave device.

FIG. 12 illustrates another variation, which can be conveniently (though not necessarily) made as a SGW hologram. The light 2*m* emitted by source 1 first passes through an optional focusing optic (e.g. a lens), enters the substrate 27 and impinges upon an optic 29 on the far face of the substrate 27. The optic 29 performs at least the function of directing the light 2*n* such that the redirected light 2*p* impinges upon the holographic surface 2*l* at the correct angle. In addition to this basic function the optic 29 can be made as a Holographic Optical Element (HOE) which effects dispersion compensation when combined with hologram 2*l*. In the case illustrated the optic 29 can be a surface relief-transmission holographic optical element, which has a reflective coating on its outer surface. Optic 28 can be used to assist the dispersion compensation by providing optical power if the hologram 2*l* in combination with the HOE 29 has no optical power. (Alternatively the element 29 can be a reflection HOE or indeed a reflective optic, which redirects and, optionally, focuses the light 2*n*.)

There are many further variations on the use of substrate guided illumination of the hologram 3.

There will also be cases where equivalent optical performance can be achieved by computing the fringe structure of hologram 3 and fabricating it using non-optical procedures (e.g. e-beam).

Figure 13:
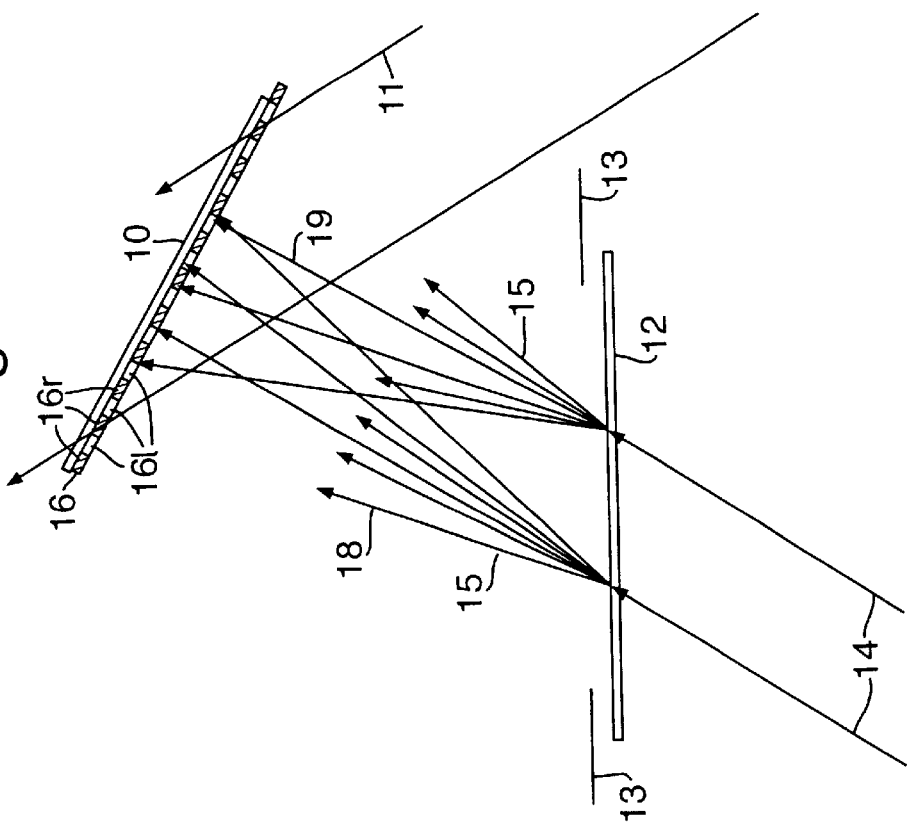
FIG. 13 illustrates a "one-step" method of fabricating the holographic optical element; and, FIG. 14 illustrates part of a display device incorporating an additional focusing optic.

As mentioned earlier, the holographic optical element 3 may be fabricated using a "one step" technique. One step methods maybe implemented in a number of ways. A simple one is illustrated in the accompanying FIG. 13. Instead of first making a master (H1) hologram from which image planed H2 copies are made (i.e. the copies are positioned within the image reconstructed by the H1) we make a hologram, which can itself be used with the LCD. In the illustrated case the hologram is masked by the masks 16 and 17 in two exposures where the mask is in very close contact with the sensitive layer and where the position of the diffuser mask 13 is moved between exposures as described previously.

There is a another class of one step holograms which use large focusing optics—e.g. large aperture low f/number lenses—to focus a real image of the object to be recorded, the holographic plate can then be put "inside" the real image.

Any 3D image provides objective information regarding the size of the object represented. In an autostereoscopic display the size of the image is restricted by the perceived size of the display. It is advantageous therefore to enlarge the apparent size of the display while retaining the autostereoscopic capability. A method of doing this with the present basic display will be described, it can be imagined as a window that reveals a three dimensional scene beyond it, just as a large object can be seen through a tiny window, so the 3D image of the object can be seen full size through the relatively small autostereoscopic "window" to be described.

Figure 14:
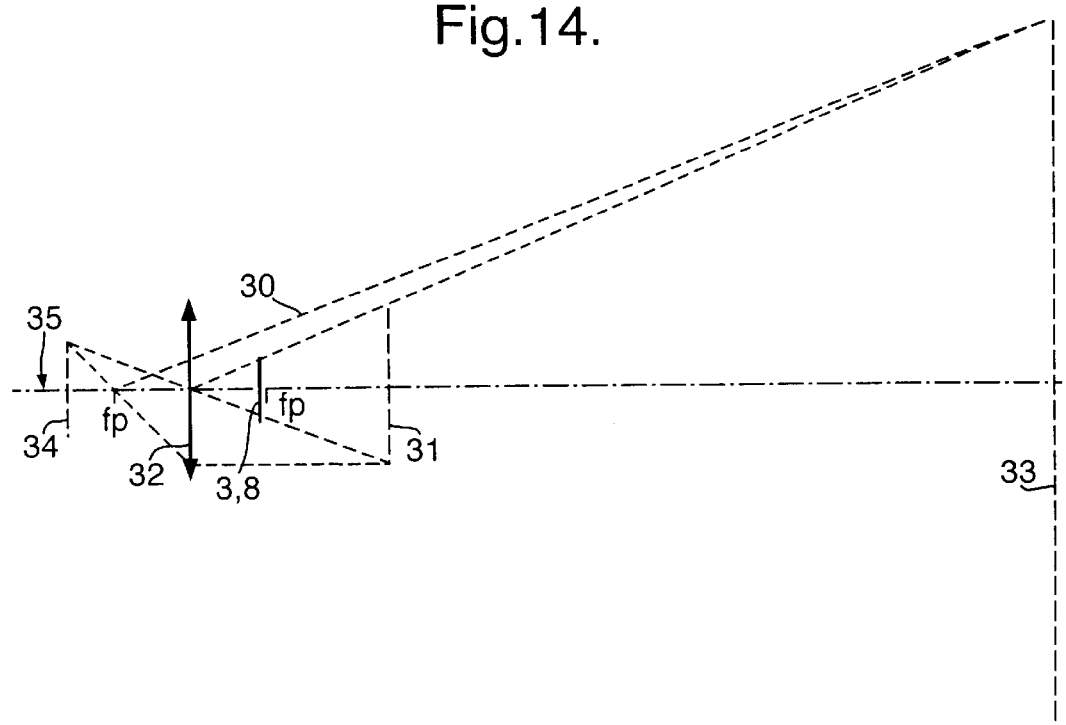

Referring to FIG. 14, line 30 represents the autostereoscopic display already described incorporating light sources 1, LCD 8 and hologram 3. The plane of the LCD 8 and Hologram 3 is indicated. The hologram can be made to provide a real image of the zone 5*l* and 5*r* (FIG. 2) or, as is the case in FIG. 13, they can be virtual images 31. An optical element 32 with positive optical power is provided and positioned so that the screen 3 or 8 of the display 30 lies between the optical element 32 and its focal plane. The simple ray tracing indicated by dotted lines shows that an enlarged virtual image 33 of the screen 3 or 8 is formed. This image 33 will be advantageously positioned such that it lies at a similar distance from the viewer 35 as the three-dimensional image generated by the stereoscopic principles used (thereby minimizing any conflict between stereopsis and accommodation). The virtual images 31 are focused by the optic 32 to form real images 34, conveniently positioned at the intended viewing position. According to the precise geometry used the location of the virtual images 31 can be adjusted and, in some cases, may be found to be advantageously formed first as real images, which remain real images when refocused by optic 32. The images 31 can also be located at infinity.

The functioning of such a display can then be understood to be the same as previously described where each eye will see a different picture and, provided the pictures are a stereo pair, the viewer will see a three dimensional image beyond the optic 32 as if beyond a window. The optic 32 can be refractive, reflective or diffractive (In each case the FIG. 14 would have to be altered in the appropriate way, though the image would form in functionally the same way.)

It is advantageous if the optical properties of the element are arranged so as to blur the pixels of the LCD. This can be achieved by introducing minimal aberrations such as those that occur very readily with a Fresnel lens. In the case of a diffractive element this can be achieved by designing such that a slightly blurred image is produced or by using the blurring that occurs though chromatic dispersion.

The use of a diffractive optical element (which would presumably be a holographic optical element (HOE) in this case) has certain advantages: The HOE can be transparent thereby enhancing the impression of a window and allowing the image to be superimposed on a real scene viewed beyond the window. HOEs can also be made with multiple independent focal points creating another way of allowing more than one viewer to enjoy the scene simultaneously. HOEs usually operate off axis, which allows for convenient and elegant construction. They also allow controllable ways of de-pixelating the image (by enlarging the source of one or more of the beams used to make the HOE.)

If a HOE is used then a number of problems need to be addressed. In particular, assuming the display is called upon to produce full color images then the problem chromatic dispersion must be addressed. One solution is to use a HOE tuned to three appropriate wavelengths. Another is to use monochromatic light in three wavelengths provided by appropriately chosen light sources or by abberration. According to the way the HOE is made this may mean that three grey scale autostereoscopic displays 30 would have to be used and may also mean that they need to be located in different positions optically (which can be achieved mechanically, optically with wavelength selective mirrors or optically with additional diffractive elements).

The display device may also comprise a system for the independent eye tracking of one or more viewers (as described more fully in our application PCT/GB93/01709). As the viewer(s) move their heads, the light source is (effectively) moved in-order to position the viewing zones correctly.

What is claimed:

1. A display device comprising a holographic optical element having at least two sets of hologram regions, a region or regions of the first set being interleaved or overlapping with an adjacent region or regions of the second set and being constructed such that light incident on each set of regions is diffracted so as to construct a respective one or more of a plurality of real or virtual images of a diffuse light source; and an image generator comprising a plurality of image elements; wherein the holographic element and its hologram regions are disposed and designed such that light diffracted by the first set of hologram regions passes through a corresponding first set of image elements and such that light diffracted by the second set of hologram regions passes through a corresponding second set of image elements.

2. A display device according to claim 1, wherein:
the image generator includes a liquid crystal array and means to illuminate the liquid crystal array, and
each image element includes one or more pixels of the liquid crystal array.

3. The display device according to claim 1, wherein the holographic element is spaced from the image generator.

4. The display device according to claim 1, wherein the holographic optical element lies adjacent to the image generator.

5. The display device according to claim 1, further comprising:
an apparatus to vary the illumination of the image generator whereby the viewing zones formed by the real or virtual images are moved.

6. The display device according to claim 1, wherein:
the image elements define a left hand and a right hand stereoscopic image, each of which is directed to a respective viewing zone; and
the display provides a stereoscopic image in use.

7. The display device according to claim 1, further comprising:
a focusing optic which creates a virtual image of the array of image elements and the holographic optical element and forms real images of the viewing zones, each image being viewed in use through a respective one of the real images of the viewing zones.

8. The display device according to claim 1, wherein the plurality of images together form a two-dimensional image.

9. The display device according to claim 1, further comprising:
a plurality of light sources which illuminate the holographic optical element simultaneously whereby a plurality of viewing positions are provided.

10. The display device according to claim 1, wherein the image generator comprises a monochrome image generator whereby color images are displayed on the image generator.

11. The display device according to claim 1, wherein the image generator is combined with a HOE arranged such that certain regions of the HOE are associated just with the pixels displaying one color separation and other regions are associated just with the pixels displaying other color separations, whereby the wavelengths of light diffracted by each set of regions towards the viewer correspond to the color of the color separation displayed by its associated set of pixels, the whole being arranged so as to display a full color two dimensional or three dimensional image.

12. The display device according to claim 1, wherein each set of regions comprises:
an array of regions.

13. The display device according to claim 1, wherein each set of regions comprises:
a holographic recording of one or more diffuse light sources in one or more of a plurality of different positions with respect to the holographic optical element.

14. The display device according to claim 1, wherein the holographical optical element is constructed as a substrate guided wave device.

15. The display device according to claim 1, wherein each set of regions comprises:
a holographic recording which has been made using a mask having an array of apertures.

16. The display device according to claim 1, wherein each set of regions diffracts light incident on the holographic optical element to form an image of an array of apertures.

17. The holographic optical element according to claim 1, wherein the holographic optical element is a surface relief hologram made by molding or embossing.

18. The holographic optical element according to claim 1, wherein the holographic optical element is a volume hologram made in photopolymer, dichromated gelatine or silver halide.

* * * * *